United States Patent

[11] 3,618,558

| [72] | Inventor | Barry Tepfer |
| | | 19 Milburn St., Rockville Center, N.Y. 11570 |
| [21] | Appl. No. | 33,782 |
| [22] | Filed | May 1, 1970 |
| [45] | Patented | Nov. 9, 1971 |

[54] UNSAFE CONDITION INDICATOR FOR FROZEN FOOD CHESTS
1 Claim, 2 Drawing Figs.

[52] U.S. Cl. .................................................. 116/114.5, 73/371, 99/192
[51] Int. Cl. .................................................. G01k 1/02
[50] Field of Search .......................................... 116/101, 106, 114.5; 73/368.3, 17, 358, 378; 99/192 TT

[56] References Cited
UNITED STATES PATENTS
| 1,779,066 | 10/1930 | Halset | 116/114.5 X |
| 2,788,282 | 4/1957 | Hammond, Jr. | 99/192 |
| 2,852,394 | 9/1958 | Fahringer | 99/192 |
| 2,915,405 | 12/1959 | Hammond, Jr. et al. | 99/192 |
| 3,090,236 | 5/1963 | Nicol | 73/358 |
| 3,290,942 | 12/1966 | Carbaugh et al. | 73/358 |
| 3,518,961 | 7/1970 | Kovac | 116/114 |

Primary Examiner—Louis J. Capozi
Attorney—Leonard H. King

ABSTRACT: A card having mounted thereon a transparent waterproof tube containing a liquid solution and a short indicator rod. The card is placed in a freezing unit until the liquid, with the rod within it, freezes. The card is then inverted in the freezer unit. When the temperature of the unit rises above the melting point of the liquid, the indicator rod will fall indicating an unsafe condition.

PATENTED NOV 9 1971

3,618,558

INVENTOR.
BARRY TEPFER

BY

Leonard H. King

ATTORNEY

UNSAFE CONDITION INDICATOR FOR FROZEN FOOD CHESTS

This invention relates to an indicator and more particularly to a thermal indicator for indicating if an unsafe temperature condition has been reached in a cold storage unit such as a frozen food chest.

BACKGROUND OF THE INVENTION

There are many substances which are kept in a frozen state until used. Many of these will spoil if they are permitted to thaw and then refreeze. Frozen foods thawed for long periods of time and then refrozen begin to deteriorate and in some cases may result in bacterial growth in the food and possible food poisoning to the eater. Also, whole blood must be stored under refrigeration below 50° F. and spoils if the temperature gets above the limit.

Ordinarily, the object to be stored is placed in a frozen unit, the desired temperature is pressed and the object is stored for many days. However, during the storage period, either through accident or neglect, the temperature may rise above the pressed maximum limit and damage the contents. When the unit again refreezes, it will not be visible that at some time during the storage period, the object had thawed and then was refrozen.

Many thermal indicators have been used in the prior art. Most of these devices are associated with the particular packed object, i.e., the frozen food or the blood container, rather than the storage unit. Also, with the prior art devices, the indicator is generally prefrozen before it is used and cannot be reused after it has once indicated an unsafe condition. Many of these thermal indicators are complex and relatively expensive devices requiring specially shaped tubes, springs, magnets and other complex parts.

It is accordingly an object of this invention to provide an inexpensive, simple thermal indicator which detects an unsafe temperature condition.

Another object is to provide a thermal indicator which can be reused without resetting the temperature state of the indicator.

A further object is to provide a thermal indicator which can be used in a cold storage unit to detect an unsafe temperature condition.

A still further object is to provide an advertising device having a thermal indicator and presenting advertising indicia on the device.

Yet another object is to provide a card supporting a thermal indicator and having room thereon for advertisements.

These and other objects of our invention will be understood from the following description taken in conjunction with the accompanying drawings.

DESCRIPTION OF PREFERRED EMBODIMENT(S)

Figure 1:
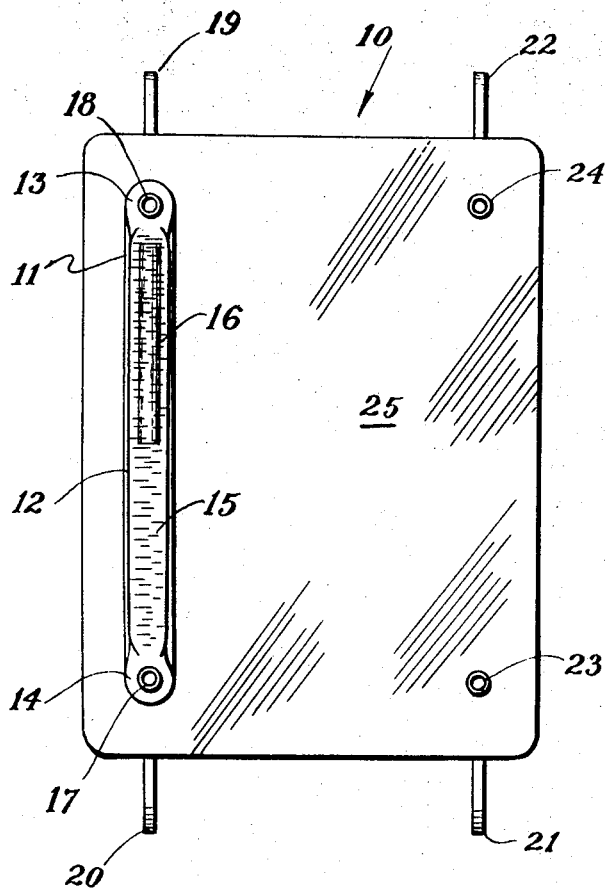
FIG. 1 is a front view of the indicator on a card.

Referring to FIG. 1, a card 10 has place on one side of it the thermal indicator shown generally at 11. The indicator consists of a transparent or translucent plastic tube 12 of about 5/16-inch diameter and about 4 inches long. The ends of tube 12 are flattened and heat sealed at 13, 14 to make the tube waterproof.

Prior to sealing the ends of the tube, approximately seven-eighths of the tube is filled with a transparent solution 15 and with the indicator rod 16. The indicator rod is typically constructed of vinyl material and is about half the length of the tube. Its diameter is sufficiently small to pass freely through the tube. Other materials can be used for the indicator rod, so long as it is clearly visible, will sink in the solution, and be of a size to be free moving in the tube.

The solution used was water with approximately 0.01 percent solution of Dupont "Zonyl," to reduce surface tension. Other solutions with similar freezing, transparency and surface tension reducing characteristics could also be used. The type of solution is dependent upon the temperature threshold desired. For a 32° F. maximum temperature, water would be used for the solution. For a lower temperature alcohol or salt would be added to the water in an amount sufficient to depress the melting temperature of the mixture to any desired value below 32° F. For a temperature above 32° F. organic compounds could be used.

The indicator tube 12, when filled and sealed then grommeted to the card by piercing the flattened ends of the tube and inserting grommets 17, 18 through the pierced holes and into the card.

Mounting hooks 19, 20 are attached to the underside of the card 10 and connected to the card using the same grommets 17, 18. Two additional hooks 21, 22 may be affixed to the card 10 at the other end thereof by means of two additional grommets 23, 24. In place of grommets 17, 18, staples or other conventional fastening means may be employed.

The card 10 is constructed of a waterproof material and the area 25 adjacent to the indicator 11 may be imprinted with an advertising message or instructions for the operation of the device.

To operate the indicator, the entire card is placed or suspended, by means of one set of hooks (18, 22 or 20, 21) in a cold storage chest such as the frozen food compartment of a refrigerator. The indicator rod 16 will immediately fall to the bottom of the tube and remain immersed in the solution. The temperature to be monitored will be below the freezing point of the solution so that the liquid will freeze in that portion of the tube that is downward.

Figure 2:
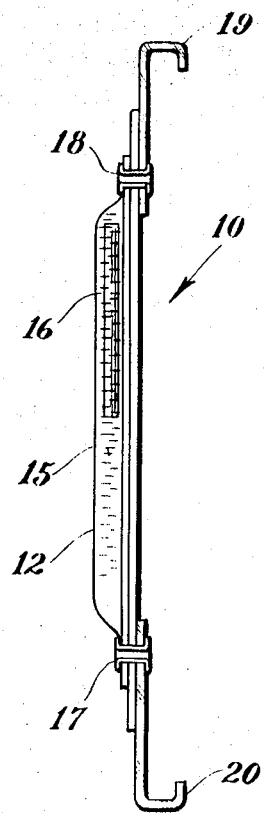
FIG. 2 is a side view of the indicator on a card.

When the liquid is frozen, the card is remounted in the freezer unit with the frozen solution containing the indicator rod, in the upward position, as shown in FIGS. 1 and 2. The opposite set of hooks may be used for the mounting. The device is left in a visible place in the freezer unit.

In the event that there is a lowering of the temperature in the freezer unit, sufficient to melt the solution, the indicator rod will be released and it will drop to the lower portion of the tube because it is heavier than the liquid. The presence of the indicator on the bottom of the tube indicates that the temperature has risen above the unsafe condition and the contents of the freezer may have been affected by the defrosting.

Even if the freezer unit had subsequently begun proper operation and the temperature had again dropped below the threshold, the indicator rod will remain on the bottom of the tube indicating that previously there was an unsafe condition.

When an unsafe condition occurs and the indicator rod is on the bottom, as soon as the liquid on the bottom has again refrozen, the card can immediately be used again by inverting it and remounting it from the opposite hooks.

It has been found that if a colored water solution is used without the rod the device is inoperative because the liquid sticks to the wall of the tube and does not drop down to indicate melting. However, if a wetting agent to reduce surface tension is added to the liquid, the liquid will freely drop down. There are many wetting agents commonly available as standard items of commerce. The quantity to be employed is readily determined by experiment and is generally not critical.

It will be seen that this device can be reused constantly without ever opening up the tube to reset the indicator or ever removing the indicator. The entire card and tube are completely waterproof so no liquids from the melting can damage the indicator during normal use.

Having thus disclosed the best embodiment of the invention presently contemplated, it is to be understood that various changes and modifications may be made by those skilled in the art without departing from the spirit of the invention.

What I claim as new and desire to secure by Letters Patent is:

1. An indicator for detecting the occurrence of a temperature rise above a preset maximum in a cold storage unit, said indicator comprising the combination of:
   a. a card;

b. an elongated transparent tube having both ends thereof sealed; said tube being secured to said card;

c. a solidifiable liquid having a melting point within a few degrees of said preset maximum temperature, said liquid almost filling said tube;

d. a transparent solution in said liquid for reducing surface tension;

e. a rod within said tube, said rod having a density greater than said liquid and said transparent solution, said rod being arranged for free longitudinal motion within said tube; and f. hook means attached to said card for mounting said tube longitudinally in either inverse direction.

* * * * *